United States Patent
Lee et al.

(10) Patent No.: US 11,900,196 B2
(45) Date of Patent: Feb. 13, 2024

(54) RADIO FREQUENCY IDENTIFICATION INTEGRATED CIRCUIT FOR REDUCING PIN COUNTS AND RFID PROVIDING METHOD THEREOF

(71) Applicant: GENERALPLUS TECHNOLOGY INC., Hsinchu (TW)

(72) Inventors: Hsin Chou Lee, Zhubei (TW); Li Sheng Lo, Hsinchu (TW); Hsien-Yao Li, Hsinchu (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 367 days.

(21) Appl. No.: 17/410,537

(22) Filed: Aug. 24, 2021

(65) Prior Publication Data
US 2022/0067472 A1    Mar. 3, 2022

(30) Foreign Application Priority Data
Aug. 28, 2020 (TW) ................................. 109129492

(51) Int. Cl.
*G06K 19/07* (2006.01)

(52) U.S. Cl.
CPC ................................. *G06K 19/0723* (2013.01)

(58) Field of Classification Search
CPC .................................................. G06K 19/0723
See application file for complete search history.

(56) References Cited

U.S. PATENT DOCUMENTS

| | | | |
|---|---|---|---|
| 9,362,619 B2* | 6/2016 | Montgomery | H01Q 1/38 |
| 9,729,210 B2* | 8/2017 | Jensen | H04B 5/0081 |
| 2012/0068830 A1* | 3/2012 | Caveney | H04Q 1/138 |
| | | | 340/10.2 |
| 2013/0093568 A1* | 4/2013 | Gay | G06K 7/10336 |
| | | | 340/10.1 |

* cited by examiner

*Primary Examiner* — Joseph H Feild
*Assistant Examiner* — Pameshanand Mahase
(74) *Attorney, Agent, or Firm* — Muncy, Geissler, Olds & Lowe, P.C.

(57) ABSTRACT

A radio frequency identification integrated circuit for reducing pin counts and an RFID providing method thereof are provided in the present invention. The radio frequency identification integrated circuit includes a first IO pin, a second IO pin and a third IO pin. The method includes determining whether the coil is coupled to the first IO pin, the second IO pin and the third IO pin when the RFID IC is enabled; and determining the identification according to the voltage status of the non-coupled pin and the pins coupled to the coil.

16 Claims, 7 Drawing Sheets ively determined whether the first input/output pin, the second input/output pin and the third input/output pin are coupled to a resonant coil. ID of the RFID IC for reducing pin counts is determined according to the voltage states of the first input/output pin, the second input/output pin and the third input/output pin which are respectively coupled to the resonant coil or not.

RADIO FREQUENCY IDENTIFICATION INTEGRATED CIRCUIT FOR REDUCING PIN COUNTS AND RFID PROVIDING METHOD THEREOF

This application claims priority of No. 109129492 filed in Taiwan R.O.C. on Aug. 28, 2020 under 35 USC 119, the entire content of which is hereby incorporated by reference.

BACKGROUND OF THE INVENTION

Field of the Invention

The invention relates to the radio frequency identification technology, and more particularly to a radio frequency identification integrated circuit for reducing pin counts and an RFID providing method thereof.

Description of the Related Art

RFID (Radio Frequency IDentification) is a wireless communication technology, for using RF signal to identify specific targets and to read/write a relative data through radio signals without the requirement to establish mechanical or optical contact between the identification system and specific targets. The radio signal is an electromagnetic field tuned to a radio frequency to transmit data from a tag on an object for automatically identifying and tracking the object. Some tags can get energy from the electromagnetic field emitted by the RFID reader during identification, and do not need a battery. And some tags have their own power source and can emit radio waves. The RF tag contains electrical information and it might be identified within a few meters. Unlike the barcode, the RF tag does not need to be in the sight of the recognizer, and it can also be embedded in the tracked object.

RFID is widely used and many industries have used RFID technology. For example, the factory can easily track the progress of the car on the production line by attaching the radio frequency tag to a car in production. The warehouse can track the location of medicines. RFID tags can also be attached to livestock or pets to facilitate the identification of livestock or pets (to prevent multiple livestock from using the same identity). The RFID ID card can allow employees to enter the locked part of the building, and the radio frequency transponder on the car can also be used to collect fees for toll roads or parking lots.

However, generally, RFID chips have their fixed IDs after production. For production products, if there are 20 products, 20 RFID chips with different IDs are required. However, the sales status of the 20 products may be different, resulting in different consumption of RFID chips with different IDs. It is a great waste for industry to produce 20 different RFID chips with different IDs.

BRIEF SUMMARY OF THE INVENTION

An objective of the invention is to provide a radio frequency identification integrated circuit for reducing pin counts and an RFID providing method thereof, wherein the same RFID chips can be produced and the IDs can be changed with an external circuit, which is not limited by the number of pins, and the circuit thereof is more flexible.

In view of this, the present invention provides a radio frequency identification integrated circuit for reducing pin counts, adapted for RFID circuit, wherein the RFID circuit at least includes a resonant coil and a resonant capacitor, wherein the RFID IC for reducing pin counts includes a first input/output pin, a second input/output pin and a third input/output pin. When the RFID IC is enabled, it is respectively determined whether the first input/output pin, the second input/output pin and the third input/output pin are coupled to a resonant coil. ID of the RFID IC for reducing pin counts is determined according to the voltage states of the first input/output pin, the second input/output pin and the third input/output pin which are respectively coupled to the resonant coil or not.

The present invention further provides an RFID providing method, adapted for RFID integrated circuit, wherein the RFID integrated circuit includes a first input/output pin, a second input/output pin and a third input/output pin, wherein the RFID providing method includes: determining whether the first input/output pin, the second input/output pin and/or the third input/output pin are respectively coupled to the resonant coil when the RFID integrated circuit is enabled; and determining output ID of the RFID integrated circuit according to the voltage states of the first input/output pin, the second input/output pin and the third input/output pin which are respectively coupled to the resonant coil or not.

In the RFID IC for reducing pin counts and the RFID providing method thereof according to a preferred embodiment of the present invention, there is a rectifier circuit between any two input/output pins, so any two input/output pins are coupled to the resonant coil and the resonant capacitor, and when an RF signal is received, the RFID IC for reducing pin counts can be enabled.

In the RFID IC for reducing pin counts and the RFID providing method thereof according to a preferred embodiment of the present invention, respectively determining whether the first input/output pin, the second input/output pin and the third input/output pin are coupled to a resonant coil when the RFID IC for reducing pin counts is enabled further includes: setting a voltage of the first input/output pin and a voltage of the second input/output pin to a floating voltage by the radio frequency identification integrated circuit for reducing pin counts; and outputting a specific voltage to the third input/output pin and determining whether one of the voltage of the first input/output pin and the voltage of the second input/output pin is changed with the specified voltage.

In the RFID IC for reducing pin counts and the RFID providing method thereof according to a preferred embodiment of the present invention, respectively determining whether the first input/output pin, the second input/output pin and the third input/output pin are coupled to a resonant coil when the RFID IC for reducing pin counts is enabled further includes: determining whether phases of signals of two of the first input/output pin, the second input/output pin and the third input/output pin are opposite to determine whether the first input/output pin, the second input/output pin and/or the third input/output pin are respectively coupled to the resonant coil.

The spirit of the invention is to provide an RFID IC which each pin can be used to couple to the resonant coil and the resonant capacitor. When the resonant coil and the resonant capacitor are coupled to different pins, the RFID IC will issue different RFID. Thus, only one production line is needed to produce RFID integrated circuits, and the IDs can be changed by external discrete circuits. In a preferred embodiment, to provide the different voltage to the residual other pins can be used to generate more different IDs.

The above-mentioned and other objects, features and advantages of the present invention will become more

DETAILED DESCRIPTION OF THE INVENTION

Figure 1A:
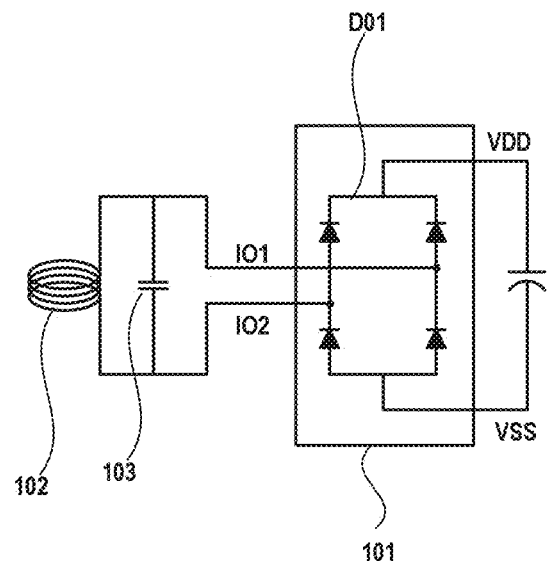
FIG. 1A is a circuit diagram showing a power supplying circuit in RFID circuit according to a preferred embodiment of the present invention.
Figure 1B:
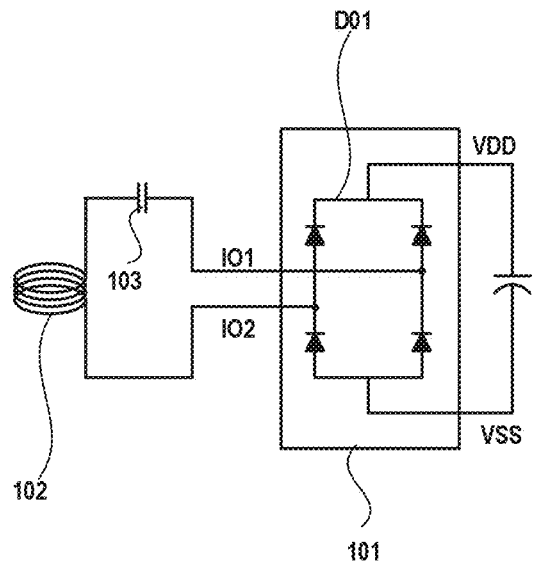
FIG. 1B is a circuit diagram showing a power supplying circuit in RFID circuit according to a preferred embodiment of the present invention.

FIG. 1A is a circuit diagram showing a power supplying circuit in RFID circuit according to a preferred embodiment of the present invention. Referring to FIG. 1A, the RFID circuit includes an RFID integrated circuit 101, a resonant coil 102 and a resonant capacitor 103. The RFID IC 101 in this embodiment has a first input/output pin IO1, a second input/output pin IO2 and a rectifier circuit D01. FIG. 1B is a circuit diagram showing a power supplying circuit in RFID circuit according to a preferred embodiment of the present invention. Referring to FIG. 1B, similarly, the RFID circuit includes an RFID IC 101, a resonant coil 102 and a resonant capacitor 103. The RFID IC 101 in this embodiment has a first input/output pin IO1, a second input/output pin IO2 and a rectifier circuit D01. The difference between FIG. 1A and FIG. 1B is the position of the resonant coil 102 and resonant capacitor 103. People having ordinary skill in the art can understand the resonance technology. Thus, the detail description is omitted.

In this embodiment, the resonant coil 102 and the resonant capacitor 103 received the RF energy, the rectifier circuit D01 rectified the energy and output to the first power terminal VDD and the second power terminal VSS to enable the RFID IC 101. In this embodiment, although the first input/output pin IO1 and the second input/output pin IO2 are illustrated, it is just for facilitating the description of the power supply principle of the RFID circuit. The number of pins is not limited thereto and the detail description is omitted.

Figure 2A:
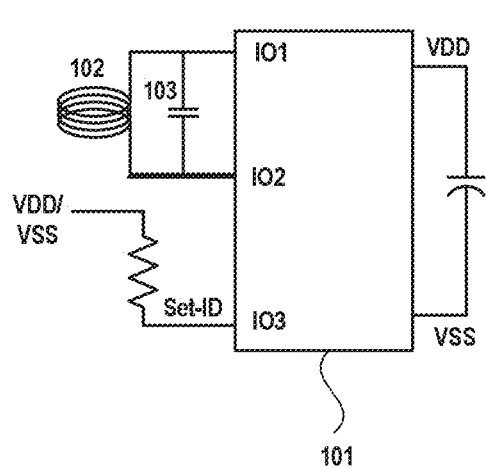
FIG. 2A is a circuit diagram showing a setting circuit for setting ID in RFID circuit according to a preferred embodiment of the present invention.
Figure 2B:
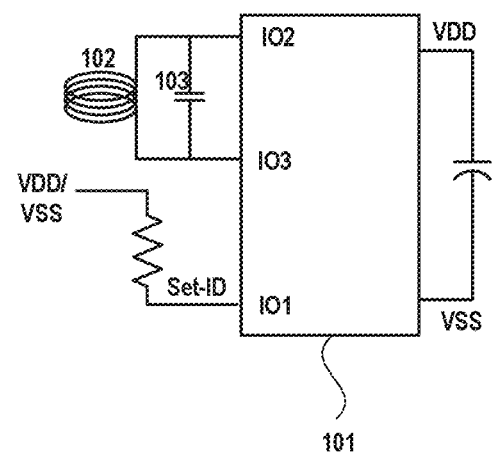
FIG. 2B is a circuit diagram showing a setting circuit for setting ID in RFID circuit according to a preferred embodiment of the present invention.
Figure 2C:
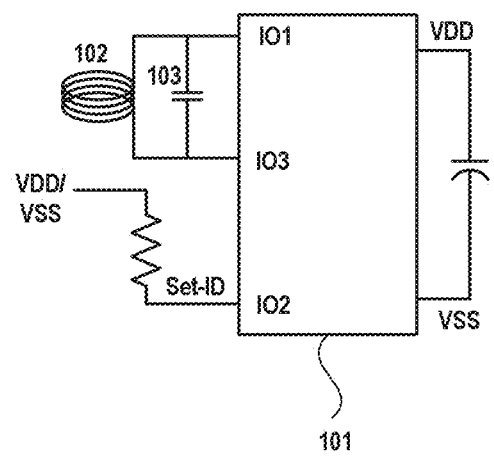
FIG. 2C is a circuit diagram showing a setting circuit for setting ID in RFID circuit according to a preferred embodiment of the present invention.

FIG. 2A is a circuit diagram showing a setting circuit for setting ID in RFID circuit according to a preferred embodiment of the present invention. FIG. 2B is a circuit diagram showing a setting circuit for setting ID in RFID circuit according to a preferred embodiment of the present invention. FIG. 2C is a circuit diagram showing a setting circuit for setting ID in RFID circuit according to a preferred embodiment of the present invention. Referring to FIG. 2A, FIG. 2B and FIG. 2C, in this embodiment, the RFID IC 101 includes the first input/output pin IO1, the second input/output pin IO2 and the third input/output pin IO3. The difference between the circuits in FIG. 2A, FIG. 2B and FIG. 2C is the coupling relationship between pins and resonant capacitor 103 and coil 102. In FIG. 2A, the resonant coil 102 and the resonant capacitor 103 are coupled between the first input/output pin IO1 and the second input/output pin IO2. In FIG. 2B, the resonant coil 102 and the resonant capacitor 103 are coupled between the second input/output pin IO2 and the third input/output pin IO3. In FIG. 2C, the resonant coil 102 and the resonant capacitor 103 is coupled between the first input/output pin IO1 and the third input/output pin IO3. Since all the input/output pins IO1, IO2 and IO3 can be used as the input of the coil, in this embodiment, the output ID is changed according to coupling relationship of the first input/output pin, the second input/output pin and the third input/output pin which are respectively coupled to the resonant coil or not.

Figure 3A:
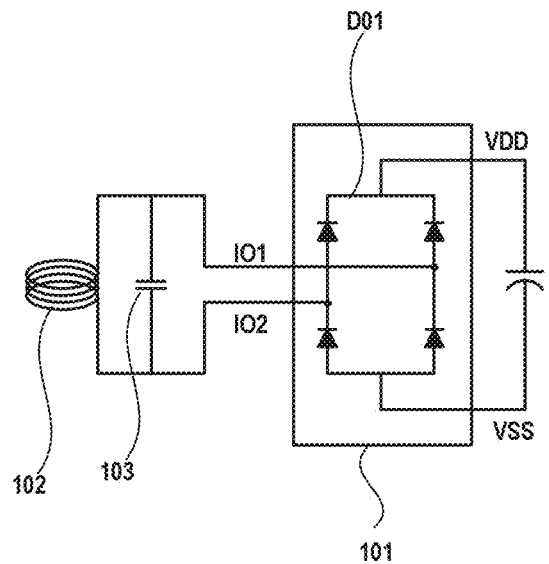
FIG. 3A is a circuit diagram showing a power supplying circuit in RFID circuit according to a preferred embodiment of the present invention.
Figures 3B, 3C:
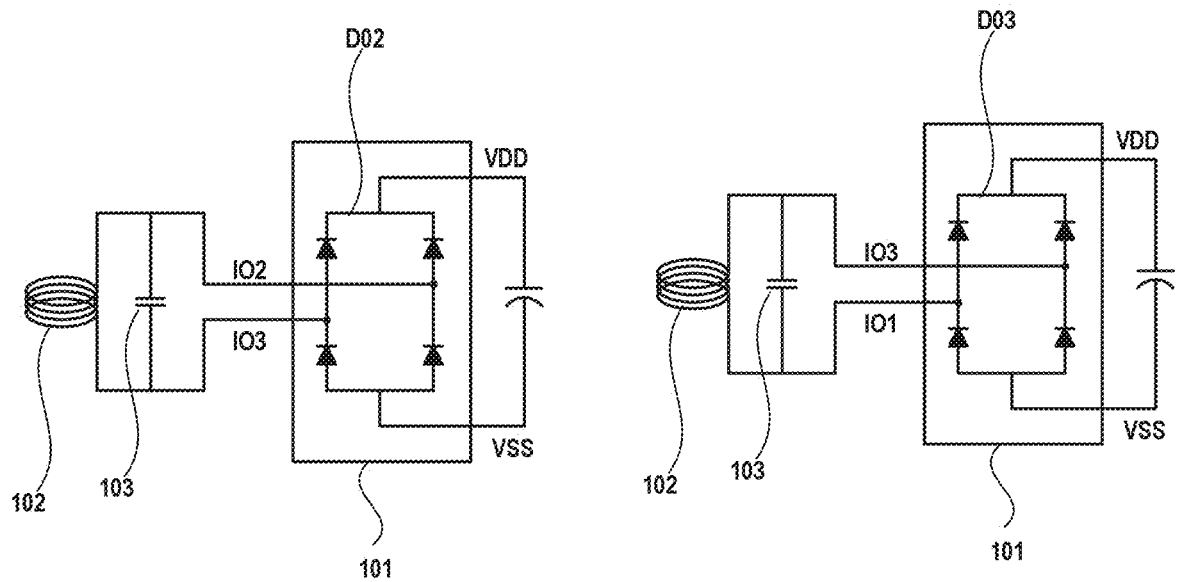
FIG. 3B is a circuit diagram showing a power supplying circuit in RFID circuit according to a preferred embodiment of the present invention.
FIG. 3C is a circuit diagram showing a power supplying circuit in RFID circuit according to a preferred embodiment of the present invention.

FIG. 3A, FIG. 3B and FIG. 3C respectively are a circuit diagram showing a power supplying circuit in RFID circuit according to a preferred embodiment of the present invention. Referring to FIG. 3A, FIG. 3B and FIG. 3C, the difference between FIG. 3A, FIG. 3B and FIG. 3C is the coupling relationship between pins and resonant capacitor 103 and coil 102. Thus, in order to enable the RFID IC 101, any two pins are coupled to the rectifier circuits D01, D02, and D03. In FIG. 3A, the first input terminal of the rectifier circuit D01 is coupled to the first input/output pin IO1, and the second input terminal of the rectifier circuit D01 is coupled to the second input/output pin IO2. In FIG. 3B, the first input terminal of the rectifier circuit D02 is coupled to the second input/output pin IO2, and the second input terminal of the rectifier circuit D02 is coupled to the third input/output pin IO3. In FIG. 3C, the first input terminal of the rectifier circuit D03 is coupled to the third input/output pin IO3, and the second input terminal of the rectifier circuit D03 is coupled to the first input/output pin IO1. The first output pin and the second output pin of the rectifier circuits D01, D02, D03 are respectively coupled to the first power terminal VDD and the second power terminal VSS.

In the embodiment of FIG. 2A, FIG. 2B and FIG. 2C, the RFID IC 101 has to determine whether the input/output pins (IO1, IO2, IO3) are respectively coupled to the resonant coil. In order to implement the present invention through this embodiment by people having ordinary skill in the art, the following detection methods are provided as examples. The first method uses the conductivity of the resonant coil. When two of input/output pins (IO1, IO2, IO3) are coupled together through the resonant coil, one of input/output pins (IO1, IO2, IO3), which is coupled to the resonant coil, is set to floating and the other input/output pin, which is also coupled to the resonant coil, is operated to switch between high and low voltage, the floating input/output pin, which is coupled to the coil, would be affected by the other input/output pin, which is also coupled to the resonant coil, such that the floating input/output pin would change with the voltage of the other input/output pin, which is also coupled to the resonant coil. Thus, when the RFID IC 101 is enabled (power on), a switched voltage is provided to the first input/output pin IO1 and the second and the third input/output pins IO2 and IO3 are detected whether the voltage change exits or not. If there is no change on the second and the third input/output pins, the switched voltage is provided to the second input/output pin IO2 and the first and the third input/output pins IO1 and IO3 are detected whether the voltage change exits or not. Afterward, the switched voltage is provided to the third input/output pin IO3 and the first and the second input/output pins IO1 and IO2 are detected whether the voltage change exits or not. Thus, the RFID IC 101 can detect whether the input/output pins (IO1, IO2, IO3) is coupled to the resonant coil.

Figure 4:
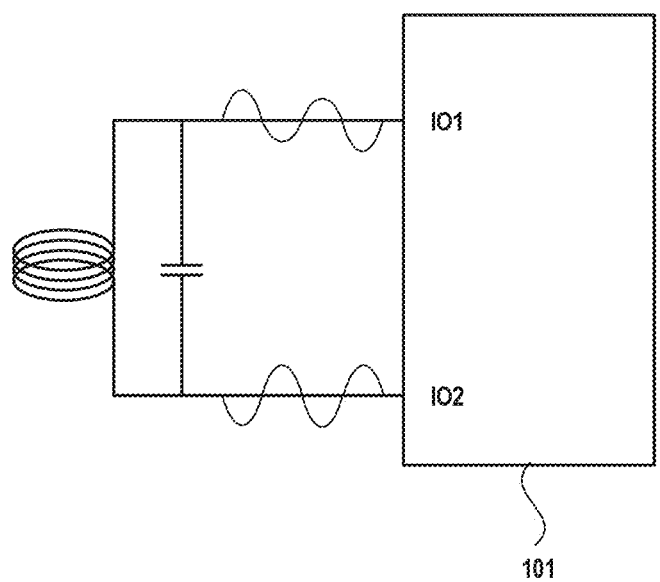
FIG. 4 is a circuit diagram showing a detecting method for detecting a pin coupled to the coil in RFID circuit according to a preferred embodiment of the present invention.

The second method may be used, for example, if the processing speed of the RFID IC 101 is sufficiently fast. Referring to FIG. 4, FIG. 4 is a circuit diagram showing a detecting method for detecting which pins coupled to the coil in RFID circuit according to a preferred embodiment of the present invention. As shown in FIG. 4, in this embodiment, it is assumed that the resonant coil is coupled between the first input/output pin IO1 and the second input/output pin IO2. The resonance waveforms on the input/output pins IO1, IO2 are set to be inverted. If the processing speed of the RFID IC 101 is fast enough, the RFID IC 101 may detect the phases of any two input/output pins (IO1, IO2, IO3). If the phases of two of the input/output pins (IO1, IO2, IO3) are opposite, it is determined that the two input/output pins (IO1, IO2, IO3) are coupled to the resonant coil.

In the abovementioned embodiment, the three input/output pins (IO1, IO2, IO3) is taken as example, after referring to the abovementioned embodiment, people having ordinary skill in the art should know that the present invention can still be implemented with more than 3 input/output pins. Thus, the present invention is not limited thereto. Moreover, in FIG. 2A, FIG. 2B and FIG. 2C, the VDD or VSS are provided to the residual input/output pin as example. That is to say, in the abovementioned example, three input/output pins (IO1, IO2, IO3) can be used to provide 6 different ID options. However, in the implementation of the circuit, in addition to being coupled to VDD or VSS, the residual input/output pin can also be floating. In another preferred embodiment, three input/output pins (IO1, IO2, IO3) can be actually used to provide 9 different ID options. When 4 input/output pins are for an example and the only VDD or VSS are provided to the residual two input/output pins, there are six coupling relationship, such as (IO1; IO2), (IO1; IO3), (IO1; IO4), (IO2; IO3), (IO2; IO4), (IO3; IO4), and four voltage providing method can be set to the residual two input/output pins. Therefore, 24 different ID options can be provided by the RFID IC 101. If the floating voltage is also adopted, 54 different ID options can be provided by the RFID IC 101.

Figure 5:
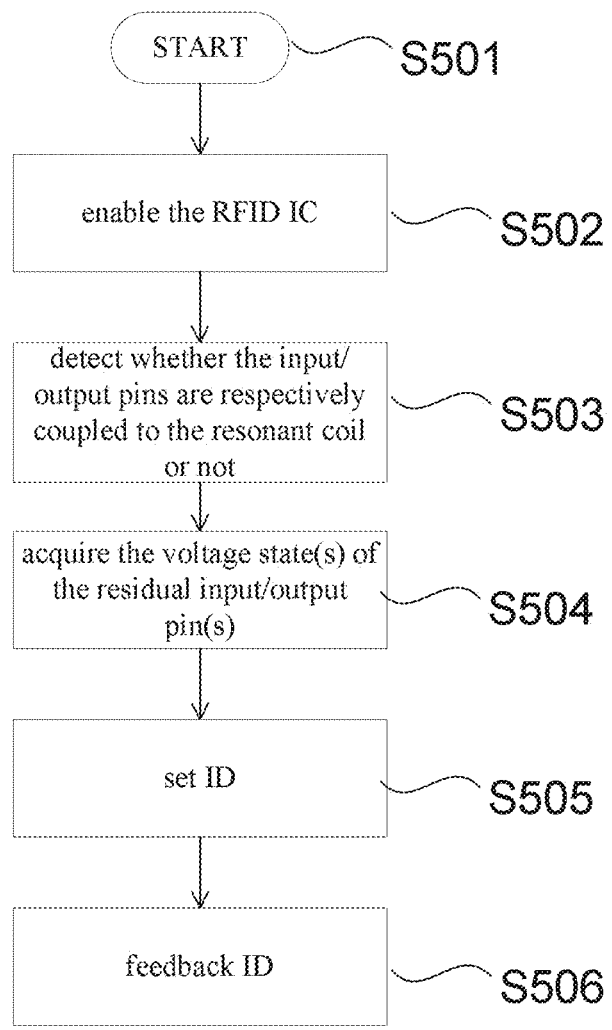
FIG. 5 is a flow chart showing a RFID providing method for reducing pin counts of RFID IC according to a preferred embodiment of the present invention.

FIG. 5 is a flow chart showing a RFID providing method for reducing pin counts of RFID IC according to a preferred embodiment of the present invention. Referring to FIG. 5, the RFID providing method includes the steps as follow.

In step S501, the method starts.

In step S502, the RFID IC is enabled.

In step S503, it is detected whether the input/output pins are respectively coupled to the resonant coil or not.

In step S504, the voltage state(s) of the residual input/output pin(s) is/are acquired. Taking FIG. 2B as an example, when it is determined that the second and third input/output pins IO2 and IO3 are coupled to the resonant coil in the step S503, the first input/output pin IO1 would be the residual input/output pin and the voltage state of the first input/output pin IO1 is acquired in the step S504. Since the ID is determined by the coupling relationship between the resonant coil and the input/output pins and voltage state of the residual input/output pin, the determined result of ID is obtained by the RFID IC when the voltage state of the first input/output pin IO1 is determined.

In step S505, ID is set according to the coupling status of the input/output pins and the voltage state(s) of the residual input/output pin(s).

In step S506, the ID is feedback.

Figures 6A, 6B:
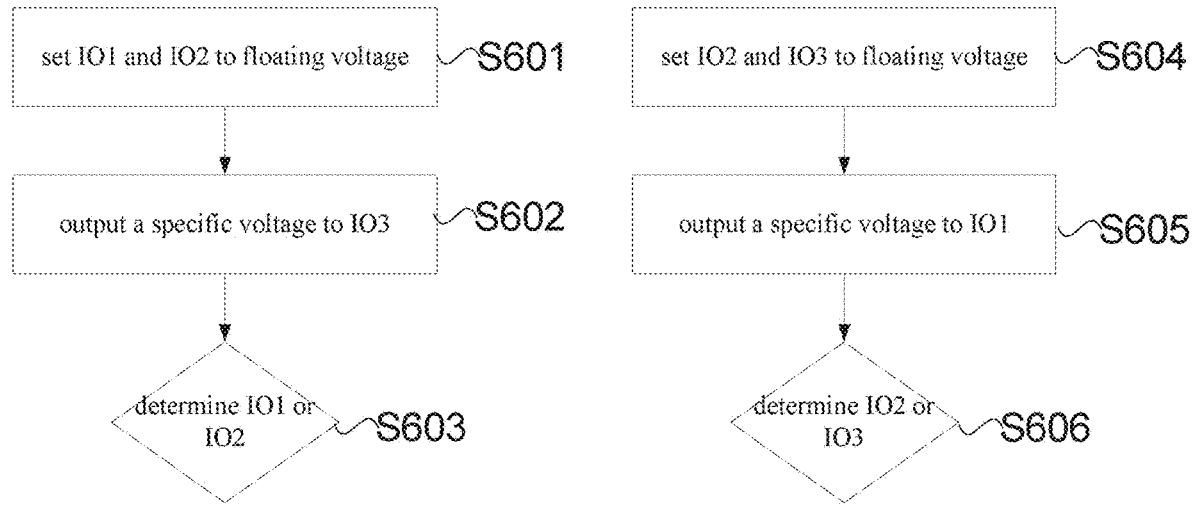
FIG. 6A is a flow chart showing the sub-steps of the step S503 in RFID providing method for reducing pin counts of RFID IC according to a preferred embodiment of the present invention.
FIG. 6B is a flow chart showing the sub-steps of the step S503 in RFID providing method for reducing pin counts of RFID IC according to a preferred embodiment of the present invention.

FIG. 6A is a flow chart showing the sub-steps of the step S503 in RFID providing method for reducing pin counts of RFID IC according to a preferred embodiment of the present invention. Referring to FIG. 6A, the step S503 includes the sub-steps as follow.

In step S601, the first input/output pin and the second input/output pin are set to floating voltage.

In step S602, the third input/output pin is output a specific voltage. The third input/output pin may be, for example, outputting a logic high voltage or a logic low voltage or alternately outputting a logic high voltage and a logic low voltage.

In step S603, it is determined whether one of the voltage of the first input/output pin and the voltage of the second input/output pin changes with the specified voltage.

FIG. 6B is a flow chart showing the sub-steps of the step S503 in RFID providing method for reducing pin counts of RFID IC according to a preferred embodiment of the present invention. Referring to FIG. 6B, the step S503 includes the sub-steps as follow.

In step S604, the second input/output pin and the third input/output pin are set to floating voltage.

In step S605, the first input/output pin is output a specific voltage. The first input/output pin may be, for example, outputting a logic high voltage or a logic low voltage or alternately outputting a logic high voltage and a logic low voltage.

In step S606, it is determined whether one of the voltage of the second input/output pin and the voltage of the third input/output pin changes with the specified voltage.

Figure 6C:
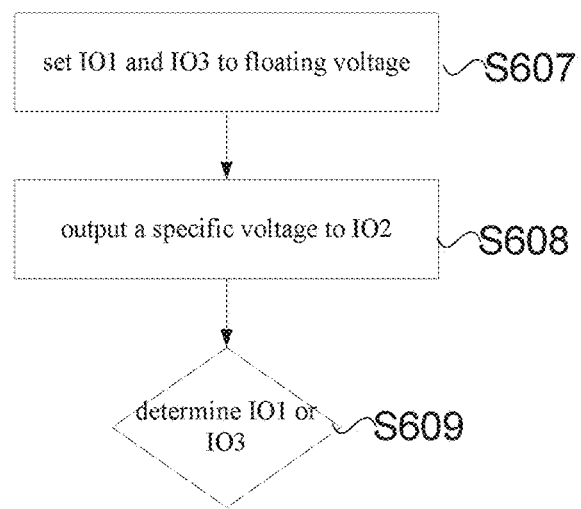
FIG. 6C is a flow chart showing the sub-steps of the step S503 in RFID providing method for reducing pin counts of RFID IC according to a preferred embodiment of the present invention.

FIG. 6C is a flow chart showing the sub-steps of the step S503 in RFID providing method for reducing pin counts of RFID IC according to a preferred embodiment of the present invention. Referring to FIG. 6B, the step S503 includes the sub-steps as follow.

In step S607, the first input/output pin and the third input/output pin are set to floating voltage.

In step S608, the second input/output pin is output a specific voltage. The second input/output pin may be, for example, outputting a logic high voltage or a logic low voltage or alternately outputting a logic high voltage and a logic low voltage.

In step S609, it is determined whether one of the voltage of the first input/output pin and the voltage of the third input/output pin changes with the specified voltage.

As mentioned above, through the above steps S601 to S609, it can be determined which two input/output pins are coupled to the resonant coil.

Figure 7:
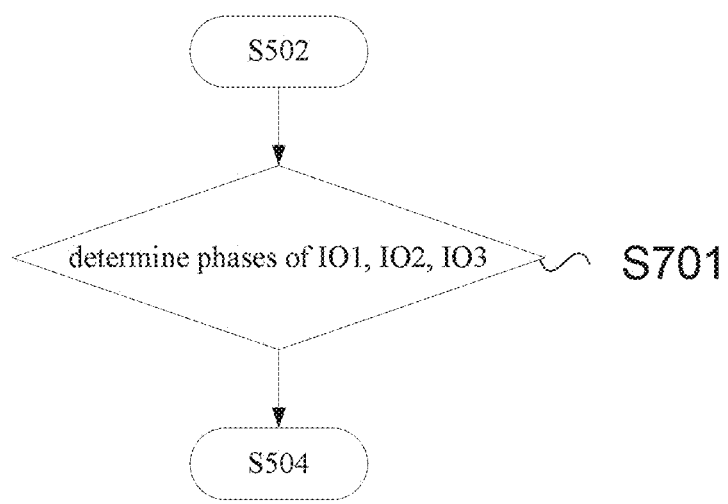
FIG. 7 is a flow chart showing the sub-steps of the step S503 in RFID providing method for reducing pin counts of RFID IC according to a preferred embodiment of the present invention.

FIG. 7 is a flow chart showing the sub-steps of the step S503 in RFID providing method for reducing pin counts of RFID IC according to a preferred embodiment of the present invention. Referring to FIG. 7 and FIG. 4, the step S503 includes the sub-steps as follow.

In step S701, it is determined whether phases of signals of two of the first input/output pin, the second input/output pin and the third input/output pin are opposite. Therefore, the RFID IC can determine whether the first input/output pin, the second input/output pin and/or the third input/output pin are respectively coupled to the resonant coil.

In summary, the spirit of the invention is to provide an RFID IC which each pin can be used to couple to the resonant coil and the resonant capacitor. When the resonant coil and the resonant capacitor are coupled to different pins, the RFID IC will issue different RFID. Thus, only one production line is needed to produce RFID integrated circuits, and the IDs can be changed by external discrete circuits. In a preferred embodiment, to provide the different voltage to the residual other pins can be used to generate more different IDs.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A radio frequency identification integrated circuit for reducing pin counts, adapted for RFID circuit, wherein the RFID circuit at least comprises a resonant coil and a resonant capacitor, wherein the radio frequency identification integrated circuit for reducing pin counts comprises:
a first input/output pin;
a second input/output pin; and
a third input/output pin,
wherein, when the radio frequency identification integrated circuit is enabled, it is respectively determined whether the first input/output pin, the second input/output pin and the third input/output pin are coupled to a resonant coil,
wherein ID of the radio frequency identification integrated circuit for reducing pin counts is determined according to the voltage states of the first input/output pin, the second input/output pin and the third input/output pin which are respectively coupled to the resonant coil or not.

2. The radio frequency identification integrated circuit for reducing pin counts according to claim 1, further comprising:
a first rectifier circuit, comprising a first input terminal, a second input terminal, a first output terminal and a second output terminal, wherein the first input terminal of the first rectifier circuit is coupled to the first input/output pin, the second input terminal of the first rectifier circuit is coupled to the second input/output pin;
wherein the radio frequency identification integrated circuit for reducing pin counts further comprises:
a first power terminal and a second power terminal, wherein the first power terminal is coupled to the first output terminal of the first rectifier circuit, and the second power terminal is coupled to the second output terminal of the first rectifier circuit,
wherein, when the resonant coil and the resonant capacitor are coupled between the first input/output pin and the second input/output pin, the first rectifier circuit provides the direct current to the first power terminal and the second power terminal to enable the radio frequency identification integrated circuit for reducing pin counts.

3. The radio frequency identification integrated circuit for reducing pin counts according to claim 1, further comprising:
a second rectifier circuit, comprising a first input terminal, a second input terminal, a first output terminal and a second output terminal, wherein the first input terminal of the second rectifier circuit is coupled to the second input/output pin, the second input terminal of the second rectifier circuit is coupled to the third input/output pin;
wherein the radio frequency identification integrated circuit for reducing pin counts further comprises:
a first power terminal and a second power terminal, wherein the first power terminal is coupled to the first output terminal of the second rectifier circuit, and the second power terminal is coupled to the second output terminal of the second rectifier circuit,
wherein, when the resonant coil and the resonant capacitor are coupled between the second input/output pin and the third input/output pin, the second rectifier circuit provides the direct current to the first power terminal and the second power terminal to enable the radio frequency identification integrated circuit for reducing pin counts.

4. The radio frequency identification integrated circuit for reducing pin counts according to claim 1, further comprising:
a third rectifier circuit, comprising a first input terminal, a second input terminal, a first output terminal and a second output terminal, wherein the first input terminal of the third rectifier circuit is coupled to the first input/output pin, the second input terminal of the third rectifier circuit is coupled to the third input/output pin;
wherein the radio frequency identification integrated circuit for reducing pin counts further comprises:
a first power terminal and a second power terminal, wherein the first power terminal is coupled to the first output terminal of the third rectifier circuit, and the second power terminal is coupled to the second output terminal of the third rectifier circuit,
wherein, when the resonant coil and the resonant capacitor are coupled between the first input/output pin and the third input/output pin, the third rectifier circuit provides the direct current to the first power terminal and the second power terminal to enable the radio frequency identification integrated circuit for reducing pin counts.

5. The radio frequency identification integrated circuit for reducing pin counts according to claim 1, wherein respectively determining whether the first input/output pin, the second input/output pin and the third input/output pin are coupled to a resonant coil when the radio frequency identification integrated circuit for reducing pin counts is enabled further comprises:

setting a voltage of the first input/output pin and a voltage of the second input/output pin to a floating voltage by the radio frequency identification integrated circuit for reducing pin counts;

outputting a specific voltage to the third input/output pin and determining whether one of the voltage of the first input/output pin and the voltage of the second input/output pin is changed with the specified voltage.

6. The radio frequency identification integrated circuit for reducing pin counts according to claim 1, wherein respectively determining whether the first input/output pin, the second input/output pin and the third input/output pin are coupled to a resonant coil when the radio frequency identification integrated circuit for reducing pin counts is enabled further comprises:

setting a voltage of the second input/output pin and a voltage of the third input/output pin to a floating voltage by the radio frequency identification integrated circuit for reducing pin counts;

outputting a specific voltage to the first input/output pin and determining whether one of the voltage of the second input/output pin and the voltage of the third input/output pin is changed with the specified voltage.

7. The radio frequency identification integrated circuit for reducing pin counts according to claim 1, wherein respectively determining whether the first input/output pin, the second input/output pin and the third input/output pin are coupled to a resonant coil when the radio frequency identification integrated circuit for reducing pin counts is enabled further comprises:

setting a voltage of the first input/output pin and a voltage of the third input/output pin to a floating voltage by the radio frequency identification integrated circuit for reducing pin counts;

outputting a specific voltage to the second input/output pin and determining whether one of the voltage of the first input/output pin and the voltage of the third input/output pin is changed with the specified voltage.

8. The radio frequency identification integrated circuit for reducing pin counts according to claim 1, wherein respectively determining whether the first input/output pin, the second input/output pin and the third input/output pin are coupled to a resonant coil when the radio frequency identification integrated circuit for reducing pin counts is enabled further comprises:

determining whether phases of signals of two of the first input/output pin, the second input/output pin and the third input/output pin are opposite to determine whether the first input/output pin, the second input/output pin and/or the third input/output pin are respectively coupled to the resonant coil.

9. An RFID providing method, adapted for RFID integrated circuit, wherein the RFID integrated circuit comprises a first input/output pin, a second input/output pin and a third input/output pin, wherein the RFID providing method comprises:

determining whether the first input/output pin, the second input/output pin and/or the third input/output pin are respectively coupled to the resonant coil when the RFID integrated circuit is enabled; and determining output ID of the RFID integrated circuit according to the voltage states of the first input/output pin, the second input/output pin and the third input/output pin which are respectively coupled to the resonant coil or not.

10. The RFID providing method according to claim 9, further comprising:

providing a first rectifier circuit, comprising a first input terminal, a second input terminal, wherein the first input terminal of the first rectifier circuit is coupled to the first input/output pin, the second input terminal of the first rectifier circuit is coupled to the second input/output pin;

wherein, when the resonant coil and the resonant capacitor are coupled between the first input/output pin and the second input/output pin, the first rectifier circuit provides the direct current to enable the RFID integrated circuit.

11. The RFID providing method according to claim 9, further comprising:

providing a second rectifier circuit, comprising a first input terminal, a second input terminal, wherein the first input terminal of the second rectifier circuit is coupled to the second input/output pin, the second input terminal of the second rectifier circuit is coupled to the third input/output pin;

wherein, when the resonant coil and the resonant capacitor are coupled between the second input/output pin and the third input/output pin, the second rectifier circuit provides the direct current to enable the RFID integrated circuit.

12. The RFID providing method according to claim 9, further comprising:

providing a third rectifier circuit, comprising a first input terminal, a second input terminal, wherein the first input terminal of the third rectifier circuit is coupled to the third input/output pin, the second input terminal of the third rectifier circuit is coupled to the first input/output pin;

wherein, when the resonant coil and the resonant capacitor are coupled between the first input/output pin and the second input/output pin, the third rectifier circuit provides the direct current to enable the RFID integrated circuit.

13. The RFID providing method according to claim 9, wherein determining whether the first input/output pin, the second input/output pin and the third input/output pin are respectively coupled to the resonant coil when the RFID integrated circuit is enabled comprises:

setting the first input/output pin and the second input/output pin to a floating voltage;

outputting a specific voltage to the third input/output pin to determining whether one of the voltage of the first input/output pin and the voltage of the second input/output pin is changed with the specific voltage.

14. The RFID providing method according to claim 9, wherein determining whether the first input/output pin, the second input/output pin and the third input/output pin are respectively coupled to the resonant coil when the RFID integrated circuit is enabled comprises:

setting the second input/output pin and the third input/output pin to a floating voltage;

outputting a specific voltage to the first input/output pin to determining whether one of the voltage of the second input/output pin and the voltage of the third input/output pin is changed with the specific voltage.

15. The RFID providing method according to claim 9, wherein determining whether the first input/output pin, the second input/output pin and the third input/output pin are respectively coupled to the resonant coil when the RFID integrated circuit is enabled comprises:
- setting the first input/output pin and the third input/output pin to a floating voltage;
- outputting a specific voltage to the second input/output pin to determining whether one of the voltage of the first input/output pin and the voltage of the third input/output pin is changed with the specific voltage.

16. The RFID providing method according to claim 9, wherein determining whether the first input/output pin, the second input/output pin and the third input/output pin are respectively coupled to the resonant coil when the RFID integrated circuit is enabled comprises:
- determining whether phases of signals of two of the first input/output pin, the second input/output pin and the third input/output pin are opposite to determine whether the first input/output pin, the second input/output pin and/or the third input/output pin are respectively coupled to the resonant coil.

* * * * *